Patented May 10, 1932

1,858,142

UNITED STATES PATENT OFFICE

ESCO F. ELLZEY, OF BUFFALO, NEW YORK, ASSIGNOR TO NATIONAL ANILINE & CHEMICAL COMPANY, INC., OF NEW YORK, N. Y., A CORPORATION OF NEW YORK

COLLOIDAL MONO-SODIUM TETRAIODOPHENOLPHTHALEIN

No Drawing.  Application filed January 21, 1928. Serial No. 248,570.

This invention relates to the mono-alkali metal salt of tetraiodophenolphthalein in colloidal form, and particularly the mono sodium salt in the form of a colloidal solution or composition which is of value for use in cholecystography.

In cholecystographic examinations of man, or gall bladder radiography, it has been heretofore the common practice to use the soluble disodium salt of tetraiodophenolphthalein, which is a colored dye, and to administer the same by mouth or by intravenous injection for the purpose of rendering the gall bladder opaque to the roentgen rays by virtue of this colored dye being excreted into the bile.

Intravenous injections of the soluble disodium salt have not proven entirely satisfactory since undesirable reactions often arise, such as headache, dizziness, nausea, weakness, etc. For enteric administration by mouth, various types of coated capsules and tablets containing the disodium salt have been employed, but they frequently not only fail to give satisfactory shadows of the gall bladder but also often produce nausea and vomiting. The capsules or tablets are apparently more or less either completely disintegrated or decomposed by the acid juices of the stomach and the dye is changed to the free acid in the form of a sticky, insoluble mass which is ineffective as a shadow-producing agent, or, if they pass through the stomach unchanged or partly changed, they are not subsequently sufficiently disintegrated and absorbed to be effective.

I have now found that if instead of using the di-alkali metal salt of tetraiodophenolphthalein as has been the practice heretofore, a colloidal form or colloidal composition of the mono-alkali metal salt is used, e. g., the mono-sodium salt, highly satisfactory gall bladder examinations can be made, and other advantages are obtained.

The present invention contemplates a process for producing a mono-alkali metal salt, more particularly the mono-sodium salt, of tetraiodophenolphthalein in colloidal form or as a colloidal composition, and it also includes the new products obtained or obtainable by said process. It has been found that the mono-sodium salt of tetraiodophenolphthalein may be prepared in colloidal form as a colloidal solution, suspension or composition which may be kept indefinitely without decomposition, and substantially without deposition of the mono-sodium salt contained therein. In this form, and particularly when subsequently admixed with grape juice, lemon juice, orange juice, or other fruit juices as an additional ingredient, it is particularly valuable for oral administration without encapsulation as a shadow-producing agent in cholecystography. Such an admixture is not offensive to the taste, produces substantially no emesis, and seldom, if ever, fails to give excellent gall bladder visualizations.

According to the present invention, the mono-alkali metal salt of tetraiodophenolphthalein is prepared in colloidal form, more particularly as a colloidal composition, solution, suspension, or emulsion, by treating a solution of the di-alkali metal salt with an acid, preferably an organic acid and especially one occurring in a fruit juice, in the presence of a colloid or of a substance exerting a protective action. Upon treatment, for example, preferably with one equivalent of acid, i. e., an amount of acid capable of reacting with one equivalent of an alkali metal, the mono-alkali metal salt is produced or formed from the di-alkali metal salt. In place of treating the di-alkali metal salt with an acid, it may be treated with a suitable acid-salt for the production of the mono-alkali metal salt. The acid or acid-salt which is employed is converted into an alkali metal salt, and thus an alkali metal salt is present as a part of the colloidal composition. Thus the treatment of di-sodium tetraiodophenolphthalein with an acid or an acid salt will result in the presence of a sodium salt in the colloidal composition.

The following example will illustrate the preferred method of preparing the colloidal solution of the mono-sodium salt of tetraiodophenolphthalein, but it will be understood that the invention is not limited thereto. The parts are by weight.

*Example:* 3 parts of disodium tetraiodophenolphthalein are dissolved in 20 parts of a hot (about 70°–85° C.) two percent aqueous gelatin solution, and to the resulting solution cooled to room temperature (about 15°–25° C.) there is added, with vigorous stirring, 3 parts of a 7.3 percent aqueous solution of citric acid. The mono-sodium salt of tetraiodophenolphthalein is produced in colloidal state in form of a stable suspension.

In the above example, instead of gelatin, other suitable protective colloids or reagents or substances which exert protective action may be used, more particularly those which are food stuffs or those which are non-poisonous and inert, such as gum arabic, gum tragacanth, edible glue, starch, dextrose, glucose, other carbohydrates, etc. all of which will be referred to in the claims by the generic expression "protective agent". And in place of citric acid, there may be used any other suitable acid such as hydrochloric acid or sulfuric acid, or preferably an organic acid, e. g., malic acid, tartaric acid, etc. Further, the amount of free acid, or of acid-salt, employed in the formation of the mono-alkali metal salt of tetraiodophenolphthalein from the di-alkali metal salt is not limited to one equivalent but may vary from this amount.

I claim:

1. A process of producing a mono-alkali metal salt of tetraiodophenolphthalein in colloidal form, which comprises acidifying a solution of a di-alkali metal salt of tetraiodophenolphthalein in the presence of a protective agent.

2. A process of producing the mono-sodium salt of tetraiodophenolphthalein in colloidal form, which comprises treating an aqueous solution of the di-sodium salt of tetraiodophenolphthalein in the presence of a colloidal substance with an organic acid which is known to occur in a fruit juice.

3. A process of producing a colloidal composition, which comprises treating a solution of a di-alkali metal salt of tetraiodophenolphthalein with a solution of citric acid in the presence of a protective colloid, the amount of citric acid being sufficient to produce a mono-alkali metal salt of tetraiodophenolphthalein.

4. A process of producing a colloidal composition, which comprises treating an aqueous solution of the di-sodium salt of tetraiodophenolphthalein with an aqueous solution of approximately one equivalent of citric acid in the presence of gelatin.

5. A process of producing a mono-alkali metal salt of tetraiodophenolphthalein in colloidal form, which comprises acidifying an aqueous solution of a di-alkali metal salt of tetraiodophenolphthalein to the mono-alkali metal stage in the presence of an edible protective colloid.

6. A process of producing a colloidal composition for use in cholecystography, which comprises acidifying a solution of a di-alkali metal salt of tetraiodophenolphthalein in the presence of a protective agent, and mixing the resulting product with a fruit juice.

7. A process of producing a colloidal composition for use in cholecystography, which comprises acidifying an aqueous solution of the di-sodium salt of tetraiodophenolphthalein, with an organic acid which is known to occur in a fruit juice, in the presence of an edible protective colloid, and mixing the resulting product with a fruit juice.

8. As a shadow-producing composition for use in radiography, a colloidal preparation comprising a mono-alkali metal salt of tetraiodophenolphthalein.

9. A composition comprising a colloidal suspension containing the mono-sodium salt of tetraiodophenolphthalein and gelatin.

10. A composition useful as a shadow-producing agent in cholecystography comprising a mono-alkali metal salt of tetraiodophenolphthalein and a protective agent.

11. A colloidal composition comprising the mono-sodium salt of tetraiodophenolphthalein, a colloid, and a salt of an organic acid which occurs in a fruit juice.

12. A colloidal shadow-producing composition for use in cholecystography obtainable by treating a solution of the disodium salt of tetraiodophenolphthalein with approximately one equivalent of citric acid in the presence of gelatin.

In testimony whereof I affix my signature.

ESCO F. ELLZEY.